United States Patent [19]

Holst et al.

[11] Patent Number: 5,265,468
[45] Date of Patent: Nov. 30, 1993

[54] ERROR DETECTION AND DISPLAY SYSTEM

[75] Inventors: Hans Holst, Hanover; Harald Kaess, Isernhagen; Erwin Petersen, Wunstorf; Johann Rothen, Sarstedt; Gerhard Ruhnau, Neustadt; Gerald Stanusch, Harsum, all of Fed. Rep. of Germany

[73] Assignee: WABCO Standard GmbH, Hanover, Fed. Rep. of Germany

[21] Appl. No.: 843,763

[22] Filed: Feb. 27, 1992

[30] Foreign Application Priority Data

Mar. 2, 1991 [DE] Fed. Rep. of Germany ....... 4106704

[51] Int. Cl.⁵ .......................................... G01M 19/00
[52] U.S. Cl. .................................. 73/118.1; 73/129; 340/441; 340/523
[58] Field of Search ............... 73/118.1, 129; 340/441, 340/523

[56] References Cited

U.S. PATENT DOCUMENTS

| | | | |
|---|---|---|---|
| 3,729,734 | 4/1973 | Kipling | 340/523 X |
| 4,817,418 | 4/1989 | Asami et al. | 73/118.1 |
| 4,926,683 | 5/1990 | Ishizeki | 73/118.1 |

FOREIGN PATENT DOCUMENTS

| | | |
|---|---|---|
| 2653153 | 6/1977 | Fed. Rep. of Germany . |
| 2604148 | 8/1977 | Fed. Rep. of Germany . |
| 2612461 | 10/1977 | Fed. Rep. of Germany . |
| 2612461 | 10/1977 | Fed. Rep. of Germany . |
| 3437980 | 4/1986 | Fed. Rep. of Germany . |
| 3527907 | 2/1987 | Fed. Rep. of Germany . |
| 3627588 | 2/1987 | Fed. Rep. of Germany . |
| 3540599 | 5/1987 | Fed. Rep. of Germany . |
| 3707980 | 9/1988 | Fed. Rep. of Germany . |
| 3901776 | 7/1990 | Fed. Rep. of Germany . |
| 3828931 | 9/1990 | Fed. Rep. of Germany . |
| 4021985 | 1/1991 | Fed. Rep. of Germany . |

Primary Examiner—Jerry W. Myracle
Attorney, Agent, or Firm—Meltzer, Lippe, Goldstein

[57] ABSTRACT

An error detection and display system for an apparatus having first and second operating states comprises a testing device, a display unit (e.g., a warning light), and a switch-on control unit. The testing device runs primary error test cycles for detecting errors of a first kind which occur during the first operating state of the apparatus (e.g., a vehicle at standstill), and secondary error test cycles which occur and can be detected only in the second state of the apparatus (e.g., the vehicle moving above a predetermined minimum speed). The system also includes a non-volatile memory wherein all occurrences of errors of the second kind are stored. The switch-on control unit switches on the testing device and the warning light when the vehicle is first started. If no error of the first kind is detected by the testing device and no error of the second kind is stored in the error memory, the switch-on control unit switches off the warning light while the vehicle is still at a standstill. However, if an error of the second kind is stored in the error memory, the switch-on control unit will keep the warning light on until the vehicle is traveling above the predetermined minimum speed and no new errors of the first or second kind are detected by the testing device.

23 Claims, 1 Drawing Sheet

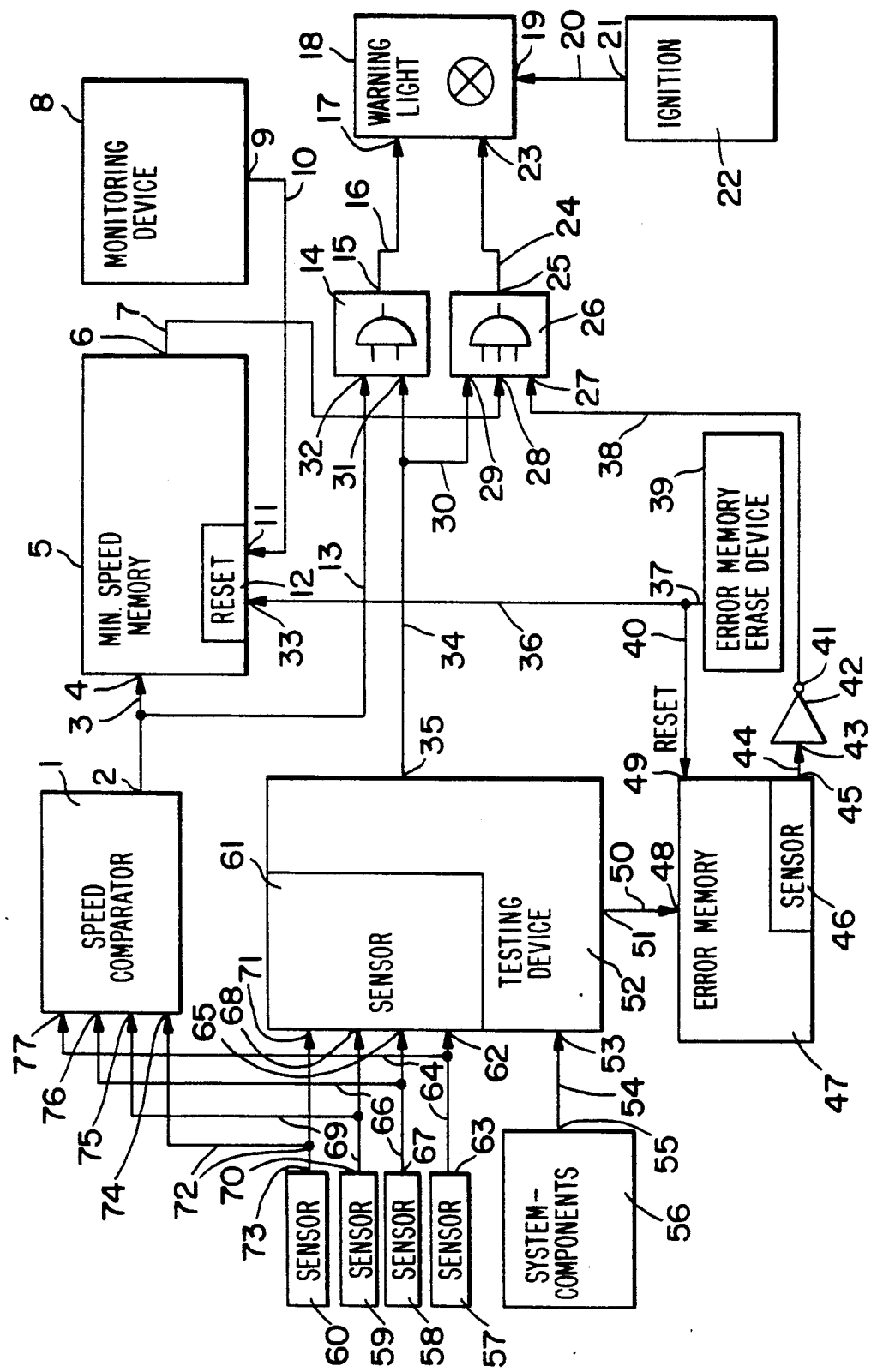

ERROR DETECTION AND DISPLAY SYSTEM

BACKGROUND OF THE INVENTION

The instant invention relates to an error detection and display device. The inventive device is especially useful for detecting and displaying malfunctions in certain operating systems of wheeled vehicles.

A known testing and display device of this type is used in passenger cars to test an anti-lock braking (ABS) system. A starting and ignition device of the vehicle serves as a switch-on control producing signals to switch on the testing and display system during or immediately after engine ignition. In this known system, a warning light, which serves as the display component of the system, goes on after ignition of the engine and the testing device goes through cyclical verification cycles to test certain components (e.g. cables, plugs, sensors, electronics, solenoid valves) and functions. When a first defined verification cycle of the testing device has been completed and no error has been detected, the warning light is switched off. This occurs relatively quickly so that this verification is usually completed while the vehicle is still standing still. In this manner, rapid and simple verification of the ABS system is achieved even before the beginning of car movement. However, if an error is detected, the warning light stays on, as is also the case when errors are detected during vehicle travel.

It is to be noted that some errors of the above-mentioned components and functions cannot be detected during a first operating state of the vehicle which is that of the vehicle at a standstill. Such errors, which may be referred to as dynamic errors, can only occur and can only be detected when the vehicle has reached a predetermined minimum speed or when the wheels rotate at a minimum rotational speed on a testing stand, i.e., in a second operating state of the vehicle. Error signals produced by rotational-speed sensors mounted on the wheels or on an axle of vehicle are examples of these dynamic errors which occur only during the second operating state of the vehicle, considered to be the vehicle travelling above a predetermined minimum speed.

Since the described verification procedure for an anti-lock braking system is carried out immediately after starting the vehicle engine and while the vehicle is at a standstill, only those errors which occur and can be detected during this first operating state can be displayed, i.e., by keeping the warning light on. Such errors may be referred to as errors of the first kind. Dynamic errors, i.e., errors of the second kind which occur and can be detected only in the second operating state of travel of the vehicle at above the predetermined minimum speed, are at first not taken into consideration in the described testing of the vehicle.

A testing system is also known for commercial vehicles in which the verification of an anti-lock braking system and thereby the lighting of the warning light is extended until the above-mentioned second state of vehicle operation is reached, i.e., until a minimum speed has been reached and dynamic errors can be measured. In this manner, it is possible to carry out a verification of the rotational-speed sensors as early as in the start-up phase of the commercial vehicle so that the driver is alerted in time of possible dynamic errors, such as rotational-speed sensor errors or errors of the rotational-speed sensor signals. With this latter type of testing device, the driver must therefore first set the utility vehicle in motion before the warning light will be switched off if no error is detected As a result of this, the warning light remains on for a relatively long period of time.

It is the object of the instant invention to provide an error detection and display system which is especially useful for a vehicle such that the detection and display of possible errors occurring only in a second state of operation and which can only be detected in that state (e.g., dynamic errors) may be detected while the vehicle is in a first state of operation (e.g., while the vehicle is still at a standstill).

SUMMARY OF THE INVENTION

According to the invention, an error detection and display system for an apparatus having first and second operating states comprises a testing device, a display unit (e.g., a warning light), and a switch-on control unit (e.g., ignition-on). The testing device runs primary error test cycles for detecting errors of a first kind which occur during the first operating state of the apparatus (e.g., a vehicle at standstill), and secondary error test cycles which occur and can be detected only in the second state of the apparatus (e.g., the vehicle moving above a predetermined minimum speed). The system also includes a non-volatile memory wherein all occurrences of errors of the second kind are stored. The switch-on control unit switches on the testing device and the warning light when the vehicle is first started. If no error of the first kind is detected by the testing device and no error of the second kind is stored in the error memory, the switch-on control unit switches off the warning light while the vehicle is still at a standstill. However, if an error of the second kind is stored in the error memory, the switch-on control unit will keep the warning light on until the vehicle is traveling above the predetermined minimum speed and no new errors of the first or second kind are detected by the testing device. Thus, the fact that errors of the second kind, which occur and can be detected only during the second operating state of the vehicle, have occurred during a previous operation of the vehicle is used advantageously as a criterion for detecting the possible further occurrences of such errors.

The invention has the advantage that the operator of the vehicle is able to ascertain the automatic switch-over of the vehicle from normal operation to an abnormal operation by observing the different time period during which the display unit is switched on and thus the operator receives an indication that errors of the second kind have occurred during a previous operation of the vehicle and that it is advisable to carry out a complete test, preferably by a qualified technician.

In one embodiment of the invention, wherein the invention is used to detect and display errors of a system which operate under the control of a control device, such as an anti-lock braking system, if a new control device is installed or the control device has been newly readjusted, the display unit will be switched off only if no error is detected upon completion of a testing cycle of the testing device which runs once a minimum vehicle speed characterizing the second operating state has been reached. This ensures the detection of possible errors even in these special cases.

In another embodiment of the invention, part of the erasable non-volatile error memory is copied into an erasable non-volatile memory copy. Provisions are made for the memory copy to contain at least all the errors of the second kind.

In another embodiment of the invention, the above-mentioned memory copy is erased after a certain number of switch-on occurrences. However, this erasure is carried out only when no errors are stored in the memory copy by the time the pre-set number of switch-on occurrences has been reached. This process ensures that if one-time errors occur, the operator of the device is informed after a certain number of switch-on occurrences by means of the display unit which is then switched off, that only an error that is transient and has no practical effect on the functioning of the device has occurred.

The results of the first complete testing cycle of the testing device can first be ascertained and, if an error has been detected during thus first complete testing cycle, the display unit remains switched on. If, however, no error has been detected during the first complete testing cycle but an error of the second kind is contained in the error memory, the display unit remains on and is switched off only upon completion by the testing device of a testing cycle which runs once the second operating state has been reached and there is still no detection of an error.

BRIEF DESCRIPTION OF THE DRAWING

The invention is explained in greater detail through the block diagram shown in the drawing.

DETAILED DESCRIPTION OF THE INVENTION

The drawing shows elements of an anti-lock braking system for a wheeled vehicle in which four rotational-speed sensors (57 to 60) are provided to detect wheel or axle speed signals and wheel acceleration and deceleration signals derived from these.

The signals are processed in a known control device (not shown) which in turn triggers brake pressure control valves in a conventional manner to regulate the braking pressure if there is any danger that the vehicle wheels may become locked.

Only the operating units which are essential for the description of this embodiment of the invention are shown in the drawing. The control device for the anti-lock braking system and the brake pressure control valves are not shown. All other components necessary for the operation of the anti-lock braking system and capable of being tested are schematically illustrated by the block (56) which represents all corresponding system components such as cables, plugs, electronics, valves, pressure modulators, etc.

The inventive system shown in the drawing is used to test the anti-lock braking system for component errors and for operating errors. For this purpose, a testing device (52) is provided which is switched on when the vehicle is started or immediately thereafter, and which goes through a defined testing cycle by means of which as many errors as possible are detected and displayed during the start-up phase, i.e., while the vehicle is at a standstill. In the first vehicle operating state thus defined, only errors of the first kind, such as cable breakage, plug interchange, etc., can be detected and displayed. Other errors, i.e., errors of the second kind which are also referred to as dynamic errors, can only be detected and displayed when the vehicle has reached a predetermined minimum speed, i.e., a second operating state.

The system shown serves to turn on a warning light (18) as the vehicle is started ("ignition on") in the first operating state of the vehicle until the testing device (52) has run a predetermined primary error test cycle and has ascertained that no error of the first kind is detected in the components accessible to testing device (52), represented herein by the system components block (56), as well as the rotational-speed sensors (57 to 60). According to the invention, whether the testing device (52) had or had not previously detected an error of the second kind by means of a predetermined secondary-error test cycle during a prior trip of the vehicle is also taken into account in determining whether to switch off the warning light (18). For this purpose, whenever errors of the second kind are detected, they are stored in an erasable non-volatile error memory (47), the contents of this memory being maintained unaltered after the power supply is switched off.

The inventive system is provided with a first AND gate (14) and with a second AND gate (26). The second AND gate (26) serves to test whether the error memory (47) contains a defined error (i.e., an error of the second kind) or not. If no error of this kind is stored in the error memory (47), the warning light (18) can be switched off immediately after starting the vehicle if no new error is detected.

If the second AND gate (26) is disabled because of an error having been stored in the error memory (47), the testing device (52) can switch off the warning light (18) via the first AND gate only when the vehicle has reached a predetermined minimum speed ascertained by means of a speed comparator (1) and if no new error has been recorded.

A speed comparator (1) is provided with inputs (74, 75, 76, 77) which are connected via signal conductors (64, 66, 69, 72) to the outputs (63, 67, 70, 73) of the four rotational-speed sensors (57, 58, 59, 60).

Each one of these rotational-speed sensors (57 to 60) is assigned to a wheel (not shown) of the four-wheel vehicle. The speed comparator (I) serves to compare the wheel velocities ascertained by means of the rotational-speed sensors (57 to 60) with a pre-set minimum speed which in the instant case is 7 km/h. The signal conductors (64, 66, 69, 72) are at the same time connected to the inputs (62, 65, 68, 71) of a sensor testing device (61) forming part of the overall testing device (52) which is dedicated to detecting errors coming from the rotational-speed sensors (57 to 60). The testing device (52) transmits testing signals in the form of testing cycles to all elements of the anti-lock braking device to be tested and receives the return test signals of the other system components (56) transmitted from the system component output (55) via a signal conductor (54) at an additional input (53).

The sensor signals are processed in the speed comparator (1). The signals appearing at the output (2) of the speed comparator (1) are transmitted on the one hand via a signal conductor (3) to the input (4) of a minimum-speed memory (5) which stores the information for determining whether the minimum speed has ever been previously detected by the speed comparator. On the other hand, these signals are also conveyed over a signal conductor (13), which is connected to the signal conductor (3), to a first input (32) of the first AND gate (14). The minimum-speed memory (5) includes an output (6) which is connected via a signal conductor (7) to a first input (28) of the second AND gate (26). Furthermore, the minimum-speed memory (5) is provided with a reset device (12) which erases the minimum-speed memory (5) in the presence of appropriate signals at the two reset inputs (11) and (33). In one instance, the resetting of the minimum-speed memory (5) is effected via a monitoring device (8) which ascertains whether a new control device has been installed in the wheeled vehicle or whether the control device has been newly adjusted. For this purpose, the output (9) of the monitoring device (8) is connected via a signal conductor (10) to the reset input (11) of the reset device (12) of the minimum-speed memory (5). The minimum-speed memory (5) is a non-volatile memory, i.e., the contents of this memory are maintained unaltered after the power supply is switched off.

The testing device (52) has a first signal output (35) which is connected via a signal conductor (34) to a second input (31) of the first AND gate (14). At the same time, the signal appearing at the first signal output (35) of the testing device (52) is conveyed via a signal conductor (30) connected to the signal conductor (34) to a second input (29) of the second AND gate (26). The testing device (52) is furthermore provided with a second signal output (51) which is connected via a signal conductor (50) to the input (48) of the erasable non-volatile error memory (47) One portion of the error memory (47) is a sensor error memory (46) which stores all the errors related to the rotational-speed sensors (57 to 60).

The error memory (47) is designed so that a detected and defined error is no longer erased after having been stored, even if it is shown in later testing cycles that this particular error no longer occurs. Of particular interest here are such defined errors as can be traced to the dynamic behavior of the rotational-speed sensors, as for instance tumbling shocks of a magnet wheel, excessive wheel bearing clearance or excessive distance between sensor and magnet wheel.

A signal conductor (44) goes via an output (45) of the sensor error memory (46) to the input (43) of an inverter (42). The output (41) of the inverter (42) is connected via a signal conductor (38) to a third input (27) of the second AND gate (26). The error memory (47) is equipped with a reset input (49) which is triggered from the output (37) of an error memory erasing device (39) via a signal conductor (40). At the same time, the output (37) of the error memory erasing device (39) is connected via a signal conductor (36), in turn connected to the signal conductor (40), to the second reset input (33) of the reset device (12) of the minimum-speed memory (5).

The output (15) of the first AND element (14) is connected by means of a signal conductor (16) to the first input (17) of the warning light (18). The output (25) of the second AND element is connected via a signal conductor (24) to a second input (23) of the warning light (18). A third input (19) of the warning light (18) is triggered via a signal conductor (20) from the output (21) of a device (22) producing a signal when the drive mechanism of the vehicle (in the instant case the ignition of a combustion engine) is switched on.

The above-described error detection and display device functions as follows:

As the ignition (22) of the wheeled vehicle is switched on, the warning light (18) is switched on simultaneously. Parallel to this event, the testing device (52) is switched on in a manner not shown here. As soon as the testing device (52) is ready to function, test cycles in the form of test signals appearing in a predetermined sequence are started by the testing device (52) which tests the functioning of the rotational-speed sensors (57 to 60) and the system components (56).

If the testing device (52) is informed by the test signals it receives back that a component of the anti-lock braking system is defective, these errors (errors of the first kind) are stored in the erasable non-volatile error memory (47). Parallel with this storing operation, the testing device (52) disables the first AND gate (14) as well as the second AND gate (26). Independently of the signals received through the other inputs of the AND gates, these two logical elements are now switched so that the warning light (18) cannot be turned off during standstill or during travel. Only a resetting of the error memory (47) by means of the error memory erasing device (39) makes it possible for the warning light (18) to go out.

If no error of the first kind is found after switching on the ignition, i.e., during the starting phase of the wheeled vehicle, and if no error is stored in the error memory (47), the testing device (52) switches off the warning light (18) via the second AND gate (26), practically while the wheeled vehicle is still standing still if the minimum-speed memory (5) contains information indicating that the speed comparator (1) has detected the minimum speed once before, i.e., during a previous trip. This manner of functioning characterizes the normal operation of the anti-lock braking system.

If, on the other hand, an error is stored in the error memory (47) during the mentioned starting phase, the warning light (18) remains on at first since the second AND gate (26) is disabled by the presence of an error in the error memory (47). The warning light (18) will now remain lit until the speed comparator (1) detects the minimum speed of all four wheels. After reaching this point, the warning light (18) is switched off by the testing device (52) via the first AND element (14) if no error is detected by the testing device (52).

After each repair of the anti-lock braking system of the wheeled vehicle, the error memory (47) is reset through the error memory erasing device (39) so that no stored errors remain in the error memory (47). At the same time, the error memory erasing device (39) transmits a signal to the reset device (12) of the minimum-speed memory (5). This process leads to an erasure of the minimum-speed memory (5) so that no information remains therein whether the vehicle had during some previous trip reached the minimum speed before Because the minimum-speed memory (5) is then empty, the second AND gate (26) is also disabled The warning light (18) goes out in this case also only when the speed comparator (1) detects the minimum speed and if the testing device (52) detects no error.

An additional function of the anti-lock braking system provides for a monitoring device (8) to ascertain whether a new or newly adjusted control device has been installed in the anti-lock braking system. If this is the case, the minimum-speed memory (5) is erased in the described manner. This means that in this case also, the warning light (18) will be turned off, via the first AND gate (14), only when the minimum speed has been reached.

As a general rule, once an error has been detected by the testing device (52) during a trip, the warning light (18) will remain on continuously for the duration of the trip until the drive mechanism of the vehicle has been switched off.

The continuous storing of detected errors in the error memory (47) makes it possible to have the error memory (47) read and erased by means of a diagnostic interface by a qualified technician so that later on error statistics can be accumulated, making it possible to draw conclusions on the functional behavior of the anti-lock braking system.

For the described anti-lock braking system, a protocol is applied by an evaluating device (not shown here) to the results of the error tests by the testing device (52). This protocol is that several such individual tests (five, for example) are considered as one defined error test before error storage takes place. This protocol ensures that transient malfunctions of the anti-lock braking system which are not concrete errors will not be recognized as such and will not be stored. In this manner, excessive sensitivity of the system is avoided and the driver or the tester of the wheeled vehicle reports only on errors which are relevant for the operation of the anti-lock braking system.

In defining the predetermined minimum speed of the vehicle in the described embodiment, the value of this minimum speed is selected to be higher than the lowest vehicle speed or the lowest rotational speed measured by the rotational-speed sensors at which any usable (i.e., fault-free) sensor signals begin to be produced for reliability reasons.

The system according to the invention can be used for vehicles having control devices such as an anti-lock braking system (ABS) and/or a drive slip control system (ASR). It can be used to advantage in general in all devices having means for error detection and display for components and/or functions of the device when it is desired that a testing device, functioning in a first operating state, should be able to obtain information on those errors which do not occur in this first operating state, but which occur only in a second operating state. Thus, possible errors occurring in the second operating state can be detected in the first operating state by means of the device according to the present invention.

A further application of the invention can be made in a production line where an essential element of this production line consists of an assembly line or a running belt. If the assembly line stands still, which could be defined as a first operating state for example, a test of all essential components of the assembly line would be conducted in this state by means of predetermined error detection tests by a testing device. Possible errors (errors of the first kind) would be displayed by means of a display unit in the form of one or more warning lights. If the assembly line is started up, the second operating state of said assembly line obtains. In this second state, errors (errors of the second kind), such as fluctuations of the assembly line, may occur. The errors occurring while the assembly line is in motion are stored in the erasable, non-volatile error memory. At each new verification of the assembly line at standstill, possible errors of the second operating state (i.e., those occurring only during the moving phase of the assembly line) will be displayed in the first operating state so that operators will be able to take early countermeasures against errors of the second kind.

Not only those operating states (e.g., movement) which are in fact alternatives to the first operating state (standstill) are to be considered as second operating states. Operating states representing a special condition (e.g., certain climatic or wind influences), or a rare but absolutely desired type of operation (e.g., switching on of more or other functions than in the first, normal operating state) can also be considered to be second operating states.

While the invention has been described by reference to a specific embodiment, this was for purposes of illustration only. Numerous alternative embodiments will also be apparent to those skilled in the art and are considered to be within the spirit and the scope of the invention.

We claim:

1. An error detection and display system for an apparatus having first and second operating states, comprising means for detecting errors of a first kind which occur and can be detected in said first operating state of said apparatus, and for detecting errors of a second kind which occur and can be detected only in said second operating state of said apparatus, means for displaying the presence of said errors of said first and second kinds, erasable non-volatile error memory means for storing the occurrence of at least said errors of said second kind, and switch-on control means for switching on and keeping on said error detection means and said display means, for switching off said display means while said apparatus is in said first operating state if no error of the first kind is detected by said error detection means and no error of the second kind is stored in said error memory means, and for switching off said display means during said second operating state of said apparatus if an error of the second kind is stored in said error memory means only if said error detection means does not detect an error of the first or second kind.

2. The system of claim 1 wherein said switch-on control means switches on said error detection means and said display means simultaneously when said apparatus is turned on.

3. The system of claim 1 wherein said switch-on control means switches on said error detection means and said display means immediately after said apparatus is turned on.

4. The system of claim 1 wherein said error detection means generates testing cycles, each testing cycle comprising a primary error test for detecting errors of the first kind and a secondary error test for detecting errors of the second kind.

5. The device of claim 4 wherein said errors of the first kind and said errors of the second kind comprise the combined results of several individual testing cycles generated by said error detection means in immediate succession.

6. The system of claim 1 wherein said first operating state comprises a state in which said apparatus is at a standstill, and said second operating state comprises a state in which said apparatus is moving.

7. The system of claim 6 wherein said apparatus comprises a wheeled vehicle having rotational speed sensors for detecting the rotational movement of said wheels, wherein said second operating state comprises a state in which said wheels are rotating at a predetermined minimum rotational speed, and wherein said errors of the second kind comprise errors relating to said rotational speed sensors.

8. The system of claim 7 wherein said errors of the second kind comprise errors which can only be detected above a second minimum rotational speed.

9. The system of claim 1 wherein said apparatus comprises a wheeled vehicle having rotational speed sensors assigned to at least one wheel of the vehicle, and a control device for regulating a function of the vehicle in response to signals received from said rotational speed sensors, wherein said second operating state comprises a state wherein said vehicle travels faster than a predetermined minimum speed.

10. The system of claim 9 wherein said control device regulates an anti-lock braking (ABS) system.

11. The system of claim 9 wherein said control device regulates a drive slip regulating (ASR) system.

12. The system of claim 9 further comprising an erasable non-volatile minimum speed memory means for recording when said vehicle travels above said predetermined minimum speed, and wherein said switch-on control means switches off said display means after said error detection means has detected an error of the second kind in said error memory means only if said error detection means has detected no error of the first or second kind, and only if said vehicle has previously reached said predetermined minimum speed.

13. The system of claim 12 further comprising means for erasing said minimum speed memory upon installation of a new control device.

14. The system of claim 13 wherein said switch-on control means switches off said display means after said minimum speed memory has been erased only if said error detection means has detected no error of the first or second kind after said vehicle has reached said predetermined minimum speed.

15. The system of claim 12 further comprising means for erasing said minimum speed memory means upon resetting of said control device.

16. The system of claim 12 further comprising means for erasing said error memory means and said minimum speed memory means.

17. The system of claim 9 wherein said switch-on control means switches off said display means after a new control device has been installed only if said error detection means has detected no error of the first or second kind after said vehicle has reached said predetermined minimum speed.

18. The system of claim 9 wherein said switch-on control means switches off said display means after said control device has been reset only if said error detection means has detected no error of the first or second kind after said vehicle has reached said predetermined minimum speed.

19. The system of claim 1 wherein said display means comprises a warning light.

20. The system of claim 1 further comprising erasable non-volatile memory copy means for copying at least a portion of said non-volatile error memory means which stores said errors of the second kind, and wherein said switch-on control means operates to switch off said display means depending upon whether an error of the second kind is stored in said erasable non-volatile memory copy means instead of in said erasable non-volatile error memory means at a time when said first operating state has been completed and said apparatus is in said second operating state and no error has been detected in said second operating state.

21. The system of claim 20 further comprising means for erasing the contents of said non-volatile error memory copy means after said switch-on control means has switched on said error detection means and said display means a predetermined number of times and no additional errors of the first or second kind have been copied into said non-volatile error memory copy means during said predetermined number of switch-ons.

22. The system of claim 21 wherein said predetermined number of switch-ons is at least equal to three.

23. A process for detecting and displaying errors in an apparatus having first and second operating states, comprising displaying an error signal when said apparatus is turned on, running a test cycle during said first operating state to determine if there is an error of a first kind which occurs and can be detected during said first operating state of said apparatus, determining whether an error of a second kind which occurs and can be detected only during said second operating state has previously occurred in said apparatus, if said error of the second kind has previously occurred, keeping said display signal on until said apparatus has entered its second operating state and no error of the first or second kind is detected.

* * * * *